United States Patent [19]

Windross

[11] Patent Number: 5,217,290
[45] Date of Patent: Jun. 8, 1993

[54] MINIATURIZED FIBEROPTIC ILLUMINATING DEVICE

[75] Inventor: Gene R. Windross, Westland, Mich.

[73] Assignee: Ford Motor Company, Dearborn, Mich.

[21] Appl. No.: 811,791

[22] Filed: Dec. 20, 1991

[51] Int. Cl.[5] .............................. F21V 8/00
[52] U.S. Cl. ...................... 362/32; 362/61; 362/282
[58] Field of Search ............ 362/32, 61, 282, 322, 362/326, 332

[56] References Cited

U.S. PATENT DOCUMENTS

| | | | |
|---|---|---|---|
| 4,677,531 | 6/1987 | Szeles | 362/32 |
| 4,811,172 | 3/1989 | Davenport et al. | 362/61 |
| 4,868,718 | 9/1989 | Davenport et al. | 362/32 |
| 4,949,227 | 8/1990 | Finch et al. | 362/61 |
| 4,958,263 | 9/1990 | Davenport et al. | 362/32 |
| 5,165,774 | 11/1992 | Windross | 362/32 |

*Primary Examiner*—Richard R. Cole
*Attorney, Agent, or Firm*—Roger L. May; Damian Porcari

[57] ABSTRACT

A miniaturized fiberoptic illuminating device includes fiberoptic cables providing a plurality of optical fibers for conducting light and ferrules inserted over end portions of the cables. Apertures which are formed from the output ends of each optical fiber pass the light from the optical fibers. The device also includes a single optical lens, which may be a cylindrical lens or a modified cylindrical lens having different lens shapes formed into the surface thereof, aligned with the apertures for receiving light emitted from the optical fibers and passed through the apertures. The lens focuses the light in a desired pattern and may be rotated to clean the lens and/or adjust the beam pattern. The device also includes a housing having a row of spaced apart cavities receiving and supporting the ferrules and a single cavity spaced forwardly of and extending transversely to the row of cavities which contains the lens. The single cavity is spaced forwardly from forward ends of the row of cavities. The housing also has an elongated slot which intersects forward ends of row of cavities and a rear side of the single large cavity and is disposed between the row of cavities and the large cavity for providing a passage from the apertures to the lens to pass light emitted from the optical fibers through the apertures to the lens.

17 Claims, 2 Drawing Sheets

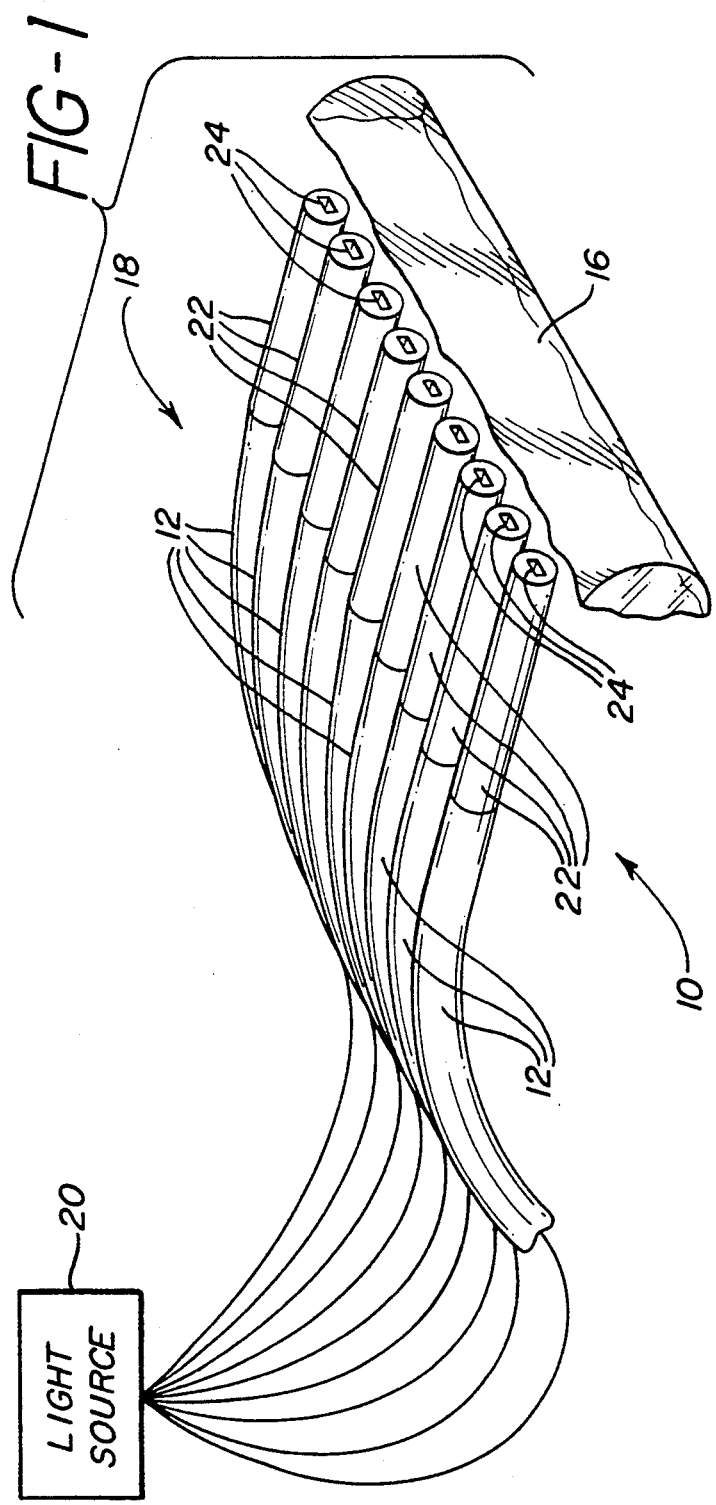
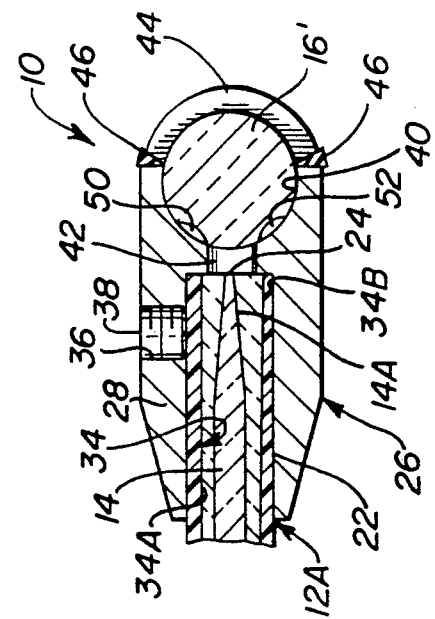

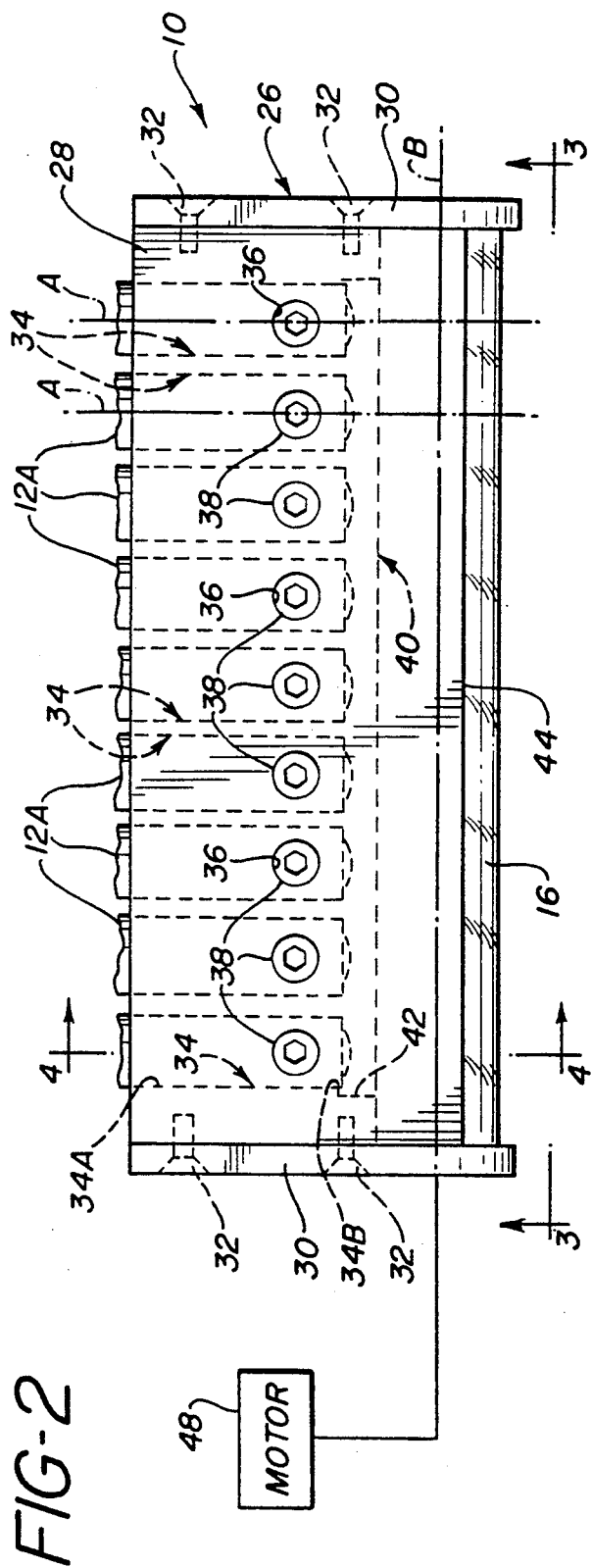
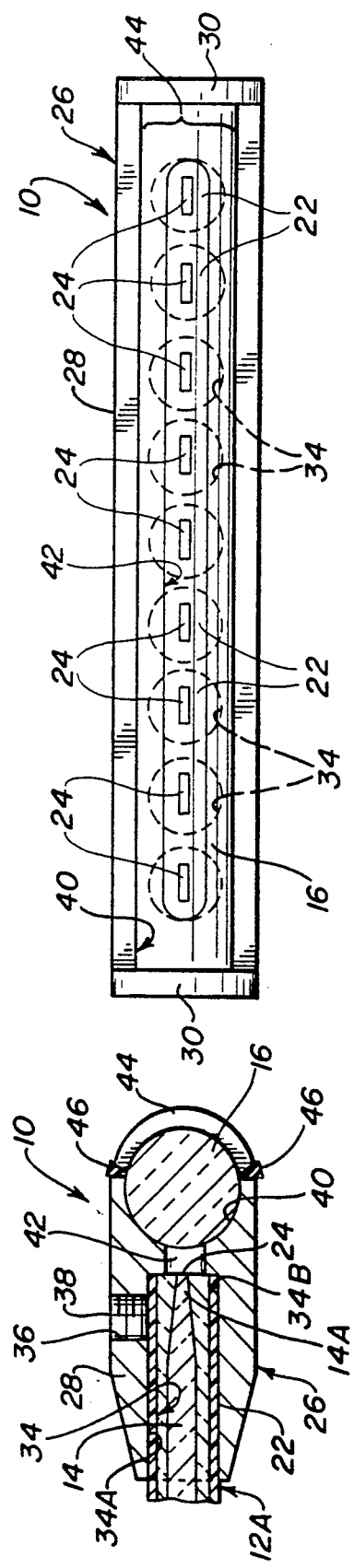

MINIATURIZED FIBEROPTIC ILLUMINATING DEVICE

CROSS-REFERENCE TO RELATED APPLICATION

Reference is hereby made to a copending patent application, by the same applicant and assigned to the same assignee, disclosing related subject matter entitled "Fiberoptic Line-Of-Light Illuminating Device", U.S. Ser. No. 810,840 filed Dec. 20, 1991.

BACKGROUND OF THE INVENTION

The present invention relates generally to fiberoptic lighting systems and, more particularly, to a miniaturized fiberoptic illuminating device, such as a headlamp, employing a plurality of optical fibers for emitting output light and a single lens for receiving and focusing the output light.

It is well known in the field of fiberoptics that optical fibers are capable of effectively and efficiently conducting light from a common source along nonlinear paths to various locations remote from the light source without encountering substantial transmission losses. Because of this capability, there is increasing interest in the application of optical fibers to uses where space is restricted. One such use is the overall illumination needs of vehicles where space is scarce due to aerodynamic and styling considerations.

One general approach to the application of optical fibers to vehicular illumination needs is proposed in U.S. Pat. No. 4,811,172 to Davenport et al., U.S. Pat. No. 4,868,718 to Davenport et al., U.S. Pat. No. 4,949,227 to Finch et al., and U.S. Pat. No. 4,958,263 to Davenport et al., all assigned to General Electric Company. These patents disclose various lighting systems that basically employ a plurality of optical fibers having their respective input ends coupled to a high intensity common light source and their respective output ends individually coupled to respective ones of a plurality of optical lenses. Thus, the operative principle underlying this approach is to use one lens per optical fiber.

While this general approach may fulfill overall illumination requirements, a major shortcoming is that it fails to accommodate space limitations dictated by vehicular aerodynamic and styling requirements. The provision of one lens per optical fiber results in devices much too large to find general application to all locations where illumination is required in vehicles. Thus, there is a need for a fiberoptic illuminating device that will satisfy the overall illumination requirements while avoiding the aforementioned major shortcoming.

SUMMARY OF THE INVENTION

This need is met by the miniaturized fiberoptic illuminating device of the present invention. The operative principle underlying the present invention is to use a single lens which is preferably a cylindrical or modified cylindrical one at the output ends of all optical fibers of the illuminating device.

An illuminating device constructed in accordance with the operative principle of the cited prior art patents will have a total length which is at least equal to the combined lengths of the individual lenses used in the device. For instance, where each lens is a spherical Fresnel lens one inch square, an illuminating device having nine fiberoptic cables under the prior art approach is at least nine inches in length. The lenses taken together add excessive length to the device.

In contrast thereto, the length of an illuminating device constructed in accordance with the operative principle of the present invention is dependent upon the length of the lens that is required to accommodate the desired number of fiberoptic cables, each cable containing a large number of individual filaments in an optical fiber bundle. Alternatively the fiberoptic cables may be liquid filled fiberoptic devices as disclosed in U.S. Pat. No. 4,958,263, the disclosure of which is hereby incorporated by reference (both embodiments hereinafter referred to as optical fibers). In the case of an illuminating device having nine fiberoptic cables, a single optical lens having a length of three and one-half inches is required. Therefore, it can be readily seen that a fiberoptic illuminating device constructed in accordance with the operative principle of the present invention is substantially miniaturized compared to one constructed in accordance with the operative principle of the cited prior art patents.

In the preferred embodiment each fiberoptic cable has a ferrule over the output end thereof and a rectangular aperture or light emission window formed by the output end thereof. A housing may be used to support the fiberoptic cables and ferrules with an elongated slot present between the output end and the single optical lens.

Preferably the single optical lens is a cylindrical one which is retained within a cavity in a housing body and which may be rotatable within that cavity. Rotatability permits cleaning of all surfaces of the lens. In the most preferred embodiment, the housing body may have a blade, gasket or grommet of an elastomeric (rubber, polymer, foam rubber, polymeric foam, etc.) or other material interfitted therein so that it contacts the lens and wipes it clean during rotation of the lens.

Alternatively the single optical lens may be of noncylindrical or a modified cylindrical shape. For example, different lens shapes may be formed into the rear surface of an otherwise cylindrical lens to provide different beam patterns such as high beam, low beam, etc. With such a modified cylindrical shape, the different beam patterns may be selected by indexing the lens to different positions of rotation about its axis.

It is thus a feature of the present invention to provide a miniaturized fiberoptic illuminating device using a single optical lens in conjunction with a plurality of fiberoptic cables; to provide the illuminating device also using a plurality of apertures formed from the output end of one fiberoptic cable; to provide the illuminating device where the apertures are rectangular in configuration; to provide the illuminating device having a housing to support in a desired spaced relationship the lens and end portions of the fiberoptic cables containing the optical fibers; and to provide the illuminating device where the housing has an elongated slot aligned between the apertures and the lens to pass light emitted from the fiberoptic cables through the apertures to the lens.

An advantage of the present miniaturized fiberoptic illuminating device in addition to its space saving feature, is its ease of assembly and alignment. A single lens is easier to assemble, easier to align, and less likely to become unaligned than the one-lens-per optic fiber systems. It also costs less.

Other features and advantages of the invention will become apparent from the following description, the accompanying drawings and the appended claims.

BRIEF DESCRIPTION OF THE DRAWINGS

FIG. 1 is a schematic representation of a miniaturized fiberoptic illuminating device constructed in accordance with the operative principle of the present invention;

FIG. 2 is a top plan view of a preferred embodiment of the miniaturized fiberoptic illuminating device;

FIG. 3 is a front elevational view of the miniaturized fiberoptic illuminating device as seen along line 3—3 of FIG. 2;

FIG. 4 is a sectional view of the miniaturized fiberoptic illuminating device taken along line 4—4 of FIG. 2; and FIG. 5 is a sectional view of the miniaturized fiberoptic illuminating device showing an alternative modified cylindrical lens shape.

DETAILED DESCRIPTION OF THE PREFERRED EMBODIMENT

Referring to FIG. 1 of the drawings, there is illustrated a schematic representation of a miniaturized fiberoptic illuminating device, generally designated 10, having a construction in accordance with the operative principle of the present invention. While the device 10 of the present invention is generally applicable to a variety of lighting applications, it is particularly suited for use in vehicle forward lighting applications such as high beam and low beam headlamps, driving lights, corner lights and turn signals. A preferred embodiment of the illuminating device 10 in the form of a headlamp is illustrated in FIGS. 2-4.

Referring now to FIGS. 1-4, the miniaturized fiberoptic illuminating device 10 basically includes a plurality of fiberoptic cables 12 each having therein a bundle of optical fibers, or a liquid filled fiberoptic device, both referred to as optical fibers 14, for conducting light and a single cylindrical optical lens 16 for receiving light emitted from the optical fibers 14 and focusing the light in a desired pattern. The illuminating device 10 is part of a lighting system, indicated by the numeral 18, which has a light source 20 coupled in a well-known conventional way to input ends of the optical fibers 14 of the fiberoptic cables 12. Any suitable light source 20 can be utilized, such as the one described in my copending application Ser. No. 656,919, filed Feb. 19, 1991, and now abandoned which disclosure is incorporated herein by reference.

The illuminating device 10 also includes means such as a plurality of end support caps or ferrules 22 inserted over end portions 12A of the respective fiberoptic cables 12. Apertures 24, which may also be described as light emission windows, are formed by the respective output ends 14A of the optical fibers 14. Apertures 24 pass the light from the optical fibers toward the single cylindrical lens 16. Each aperture 24 preferably has a rectangular configuration for passing a pattern of light of the desired shape. As shown, the filaments in the optical fiber bundle can be arranged, or the plug in the end of the liquid filled fiberoptic device can be shaped, so that optical fibers 14 have output ends 14A the size and shape of rectangular aperture 24. However, the output ends 14A of optical fibers 14 and/or the apertures 24 can have other configurations for providing other light pattern shapes.

The illuminating device 10 also includes a housing 26 composed of a body 28 and a pair of opposite side strips 30 being secured to opposite sides of the body 28 by suitable means, such as pairs of threaded fasteners 32. The housing body 28 has formed therein a plurality of generally cylindrical first cavities 34 open at their rear ends 34A for receiving and supporting the ferrules 22 on the end portions 12A of the cables 12. A plurality of threaded holes 36 are tapped through the upper side of the housing body 28 to respectively intersect with the first cavities 34 adjacent to their forward ends 34B. Set screws 38 are threaded into the holes 36 to engage and releasably secure the ferrules 22 in the first cavities 34. Alternatively, ferrules 22 at the end of the fiberoptic cables 12 may have a threaded exterior surface (not shown) and cavities 34 may be correspondingly threaded (not shown) for receipt of the threaded ferrule. The first cavities 34 are arranged in the housing body 28 in spaced apart relation to one another and in a row and extend generally parallel to one another.

The housing body 28 also has a single cylindrical second cavity 40 spaced forwardly of the forward ends 34B of the first cavities 34. The second cavity 40 extends in transverse relation to the first cavities 34. Also, the second cavity 40 is larger in diameter than each of the first cavities 34 for containing the cylindrical lens 16 which is larger in diameter than the ferrules 22 on the fiberoptic cables 12. The above-described arrangement of the parallel first cavities 34 with the single transverse second cavity 40 ensures alignment of the central axes A of the end portions 12A of the fiberoptic cables 12 in generally parallel relation with each other and generally perpendicular intersecting relation with the central axis B of the cylindrical lens 16.

The housing body 28 further has an elongated slot 42 located between the forward ends 34B of the first cavities 34 and the rear side of the second transverse cavity 40. The slot 42 which intersects the forward ends 34B of the first cavities 34 and the rear side of the second cavity 40 provides a passage from the apertures 24 to the cylindrical lens 16 to pass light emitted from the optical fibers 14 through the apertures 24 to the lens 16. Slot 42 spaces the end of the optical fibers 14 from the lens 16 at a distance which is approximately the focal length of lens 16. The housing body 28 also defines a substantially semi-cylindrical opening 44 along a front end intersecting with a front side of the second cavity 40 for permitting light focussed by the lens 16 to pass from the housing 26. As shown in FIG. 4, there is fitted in housing body 28 a blade, gasket or grommet 46 which may be an elastomeric material such as rubber, polymer, foam rubber, polymeric foam, etc. which will wipe clean cylindrical optical lens 16 when lens 16 is rotated within cavity 40. Thus, as shown in FIG. 2, a motor 48, such as a stepper motor, may be attached to lens 16 for rotation of lens 16 around central axis B. By periodically rotating lens 16 around central axis B, the exterior, light receiving/transmitting surfaces of cylindrical optical lens 16 may be cleaned. Blade, gasket or grommet 46 may be made replaceable so that a fresh one can be inserted when the old one becomes soiled. The forward end portions of the side strips 30 of the housing 26 close the opposite ends of the second cavity 40. Either one of the side strips 30 can be detached from the housing body 28 in order to remove the lens 16 from the housing 26.

Thus, the single cylindrical optical lens 16 aligned with the apertures 24 of the fiberoptic cables 12 receive light emitted from the optical fibers 14 and passed through the apertures 24 and elongated slot 42. The cylindrical lens 16 then focuses the light in a desired pattern. A practical example of some of the dimensions of the illuminating device 10 are as follows. In a rectangular configuration, the apertures 24 have a height of 0.020 inch and length of 0.150 inch. The fiberoptic cables 12 are 5/16 inch in diameter and mounted ⅜ inch apart. The cylindrical lens 16 is ½ inch in height and 3½ inches in length.

Referring to FIG. 5, where like reference numerals have been used to the extent possible, there is shown a modified cylindrical lens 16' which is formed from a cylindrical one, but has lens shapes 50, 52 formed therein. The beam pattern, such as high beam, low beam, fog light, etc. can be selected by rotating modified cylindrical lens 16' using motor 48 so that lens shape 50, or lens shape 52 or an unshaped area of lens 16' is aligned with apertures 24 in order to focus light from opening 44 in the desired pattern.

Having thus described the miniaturized fiberoptic illuminating device of the present invention in detail and by reference to a preferred embodiment thereof, it will be apparent that modifications and variations are possible without departing from the scope of the invention defined in the appended claims.

What is claimed is:

1. A miniaturized fiberoptic illuminating device, comprising:
   means providing a plurality of optical fibers for conducting light, said optical fibers having output ends for emitting light;
   means defining a plurality of apertures each formed from said output ends of each optical fiber for passing light from said optical fiber; and
   a single, cylindrical optical lens being elongated along a central axis, said axis being aligned with said apertures for receiving light emitted from said optical fibers and passed through said apertures and focusing the light in a desired pattern.

2. The device of claim 1 further comprising:
   a housing defining a plurality of spaced apart first cavities receiving and supporting end portions of said optical fibers which terminate at said output ends thereof.

3. The device of claim 2 wherein said housing also defines an elongated second cavity containing said cylindrical lens and spaced forwardly from and extending in transverse relation to said first cavities.

4. The device of claim 3 wherein said housing further defines an elongated slot intersecting forward ends of said first cavities and a rear side of said second cavity and disposed between said first cavities and said second cavity for providing a passage between said apertures and said cylindrical lens to pass light emitted from said optical fibers through said apertures to said cylindrical lens.

5. The device of claim 1 further including:
   a means to rotate said cylindrical lens about its axis.

6. The device of claim 1 wherein said cylindrical lens has different lens shapes formed into the surface thereof.

7. The device of claim 1 wherein said means providing said plurality of optical fibers is a plurality of fiberoptic cables.

8. The device of claim 7 wherein said means defining said plurality of apertures is a plurality of ferrules inserted over end portions of said respective fiberoptic cables containing said output ends of said optical fibers.

9. The device of claim 8 further comprising a housing defining a plurality of spaced apart first cavities receiving and supporting said ferrules, an elongated second cavity containing said lens and spaced forwardly from and extending in transverse relation to said first cavities, and an elongated slot intersecting forward ends of said first cavities and a rear side of said second cavity and disposed between said first cavities and said second cavity for providing a passage between said apertures and said lens to pass light emitted from optical fibers through said apertures to said lens.

10. A lighting system, comprising:
    a source of light;
    means defining a plurality of optical fibers for conducting light, said optical fibers coupled to said light source for receiving light and having output ends for emitting light;
    means defining a plurality of apertures each formed from said output ends of each optical fiber for passing light from said optical fiber;
    a single, cylindrical optical lends aligned with said apertures for receiving light emitted from said optical fibers and passed through said apertures and focusing the light in a desired pattern; and
    means for rotating said lens about its axis.

11. The system of claim 10 further comprising:
    a housing defining a plurality of spaced apart first cavities receiving and supporting end portions of said optical fibers which terminate at said output ends thereof.

12. The system of claim 11 wherein said housing also defines an elongated second cavity containing said cylindrical lens and spaced forwardly from and extending in transverse relation to said first cavities.

13. The system of claim 11 wherein said housing further defines an elongated slot intersecting forward ends of said first cavities and a rear side of said second cavity and disposed between said first cavities and said second cavity for providing a passage between said apertures and said lens to pass light emitted from said optical fibers through said apertures to said cylindrical lens.

14. The system of claim 10 wherein said cylindrical lens has different lens shapes formed into the surface thereof.

15. A miniaturized fiberoptic illuminating device, comprising:
    means providing a plurality of optical fibers for conducting light, said optical fibers having output ends for emitting light;
    means defining a plurality of apertures formed from said output ends of each optical fiber for passing light from said optical fiber;
    a single, cylindrical optical lens aligned with said apertures for receiving light emitted from said optical fibers and passed through said apertures and focusing the light in a desired pattern;
    a housing defining a plurality of spaced apart first cavities receiving and supporting end portions of said optical fibers which terminate at said output ends thereof; said housing also defining an elongated second cavity containing said cylindrical lens and spaced forwardly from and extending in transverse relation to said first cavities;
    said housing further defining an elongated slot intersecting forward ends of said first cavities and a rear side of said second cavity and disposed between said first cavities and second cavity for providing a passage between said apertures and said cylindrical lens to pass light emitted from said optical fibers through said apertures to said cylindrical lens; and means for rotating said cylindrical lens about its axis within said second cavity.

16. The device of claim 15 wherein said housing includes a gasket or grommet therein which is in contact with said cylindrical lens.

17. The device of claim 15 wherein said cylindrical lens has different lens shapes formed into the surface thereof.

* * * * *